Dec. 9, 1969    E. J. ANDERSON    3,482,546
SANITARY LITTER BOX FOR PETS
Filed Sept. 1, 1967
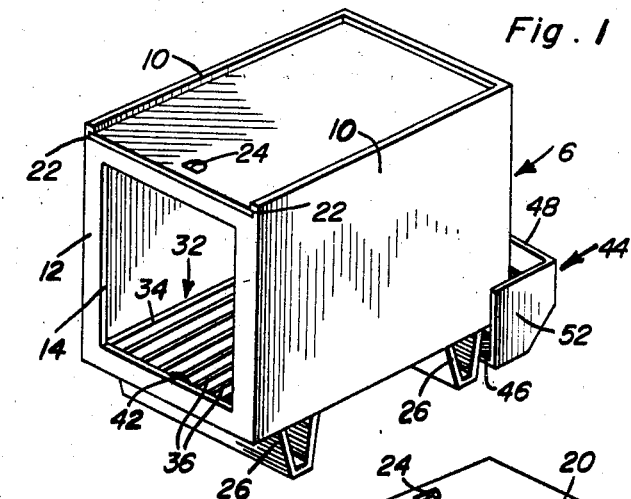
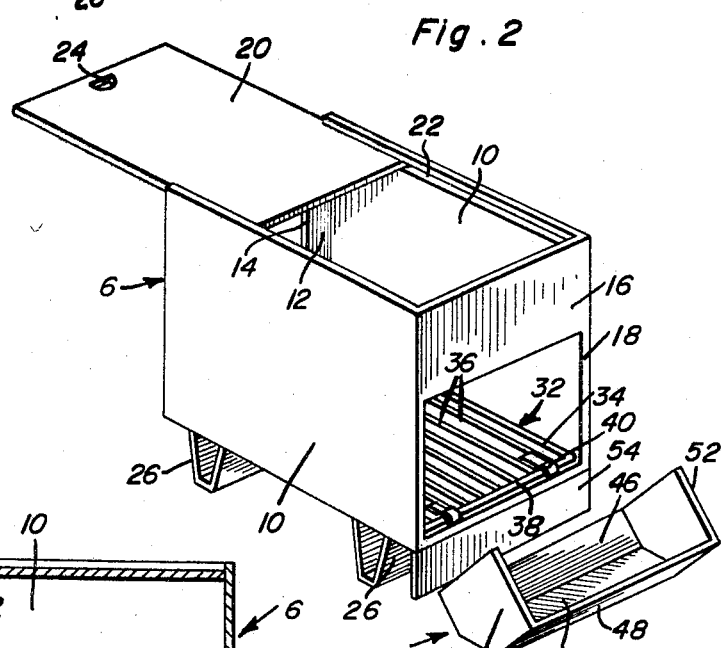
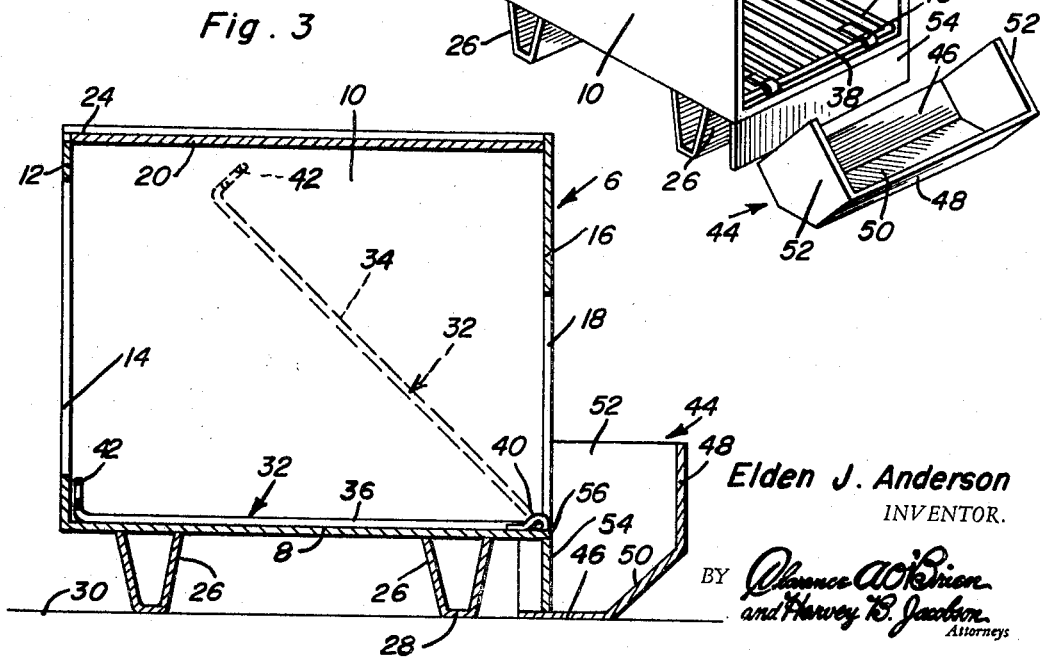
Elden J. Anderson
INVENTOR.

United States Patent Office 3,482,546
Patented Dec. 9, 1969

3,482,546
SANITARY LITTER BOX FOR PETS
Elden J. Anderson, Rte. 1, Thornton, Idaho 83453
Filed Sept. 1, 1967, Ser. No. 665,064
Int. Cl. A01k 1/02
U.S. Cl. 119—1
8 Claims

ABSTRACT OF THE DISCLOSURE

A sanitary box-type indoor privy for cats. The cat enters and leaves by way of a front wall opening. The bottom portion is bedded with kitty litter or sand. An openwork grate normally rests atop the bottom wall. The rear end of the grate is hinged. The front end of the grate can be lifted by hand free of the litter and angled to assume an inclined position in a manner to dump the excrement through a rear wall opening into an applicable and removable trapping and emptying tray.

---

This invention relates to certain new and useful improvements in a portable privy-type pet box for indoor use, more particularly, to a cat box which lends itself to practical utilization of a bed of loose sand, kitty litter or the like and which embodies self-contained facilities for collecting, handling, convenient trapping, and unhampered disposition of excrement while maintaining the bedding material intact for reasonably prolonged use.

Briefly the concept has to do with a box embodying a bottom wall, side walls, front and rear end walls and an openable top having a sliding lid providing an inspection and access cover. The front wall has an opening which provides an entrance to and an exit from the animal enclosure. The rear wall has an opening by way of which the accumulated excrement can be appropriately and safely discharged into a readily attachable and detachable trapping and emptying tray. A grate of requisite size is hinged in the enclosing space and can be lifted by hand, then angled to a position inclining toward said rear wall opening and excrement receiving, carrying and dumping tray. The bottom wall has depending rests which reside on the room floor and locate a rearward apron-like flange in a position to facilitate lining up the tray with the excrement unloading opening in the rear end wall of the box.

The sanitary litter box above set forth is such in construction and capability that the owner can cope with the often bothersome chore of collecting and conveniently disposing of excrement. The pet can be housebroken and trained to use the open front when entering and leaving. The lid can be opened for access and cleaning. The grate when lifted and tilted allows the litter to sift therethrough. The tray can be applied and removed at will.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view in perspective of a sanitary litter containing pet accommodating privy-type box constructed in accordance with the principles of the invention and showing the same set up for use.

FIG. 2 is a view also in perspective but at a different angle and which shows the lid or cover partly opened and shows the manner in which the attachable and detachable excrement tray is applicable and usable.

FIG. 3 is a view on an enlarged scale and taken centrally through the box, said view being in section and the liftable and lowerable grate being shown in full and phantom lines, respectively.

The improved box may be made of appropriate sheet material and is preferably but not necessarily, rectangular in shape. The box is designated, as an entity, by the numeral 6 and has a flat horizontal bottom wall 8 which, like the vertical side walls 10 is imperforate. At the left in the views of the drawing there is one end wall which is differentiated as the front end wall 12 and this wall is provided with an opening 14 of appropriate size. This opening permits the pet to enter and leave the enclosed space in a now generally well-known manner. The rear vertical end wall is denoted at 16 and is provided with a smaller opening 18 designated as an excrement discharging opening. The top of the box is open in the manner illustrated in FIG. 2 but is capable of being closed by a lid or cover 20 which is slidingly mounted in keying grooves provided therefor at the upper portions of the side walls as at 22. The numeral 24 designates a conveniently usable finger niche. The underneath side of the bottom wall 8 is provided with forward and rearward spaced parallel transversely attached rests 26 having flat bottom portions 28 which are adapted when in use to reside flatwise on the room floor or other surface 30. The bottom wall 8 of the box 6 is also sometimes referred to as a floor for the reason that in practice it is covered with appropriate sand, kitty litter, or equivalent material (not shown). The aforementioned openwork grate is denoted by the numeral 32 and comprises a rectangular or equivalent frame 34 which is practice resides flat wise atop the interior of the bottom wall 8. This frame is provided with spaced parallel longitudinal appropriately spaced bars or rods 36 to provide the desired screening and sifting result. The frame bar 38 at the right in FIGS. 2 and 3 is pivotally or hingedly bracketed in place on the bottom wall 8 as denoted at 40. The front end of the grate is provided with a suitable upstanding fingergrip 42. It follows that the grate normally rests in the usable position shown in full lines in the several views of the drawing. Obviously, by catching hold of the handle means or fingergrip 42 and lifting and swinging the grate upwardly it can be caused to assume the rearwardly and downwardly inclined dumping position whereupon it is then lined up with the excrement discharging opening 18.

When it is desired to unload or shunt the collected excrement it is desirable, as is evident, to provide a trapping receiver such as shown and which preferably comprises an attachable and detachable shallow but suitably deep tray 44. This tray comprises a bottom wall 46, rearward wall 48 and an intervening inclined wall portion 50 joining the bottom wall 46 with the rear wall 48. The transverse end walls are denoted at 52 and these several walls combine in providing a tray which is open at the front (that is at the left in the drawing) and also open at the top. To assist in orienting and positioning as well as retaining the tray when it is brought into use a depending apron-like flange 54 is provided. This flange is attached as at 56 to the rear end of the bottom wall 8 and is of a length corresponding to the width of the rear wall 16. The lower edge portion is spaced slightly above the bottoms 28 of the rests so as to allow the bottom wall 46 of the tray to be slid underneath the flange 54 to properly line up the tray with the opening 18 and also the inclined excrement dumping grate 32. The tray serves not only as a practical trap but also as a convenient carrier in a seemingly self-evident manner.

In practice the lid is kept closed and the box is placed on the room floor or wherever desired and is supported in an elevated position by the rests 26. Although it is not necessary it is believed that it is desirable to keep the tray 44 in its assembled ready-to-use position inasmuch as the animal when using the enclosure may tend to push or scrape some of the sand or litter through the opening 18. The steps in utilizing the openable and closable lid 20, attaching and detaching the optionally usable tray 44, and the lifting and lowering of the grate 32 are deemed to be substantially self-evident. Accordingly, a more extended description is deemed to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A portable indoor animal excrement collecting, handling and sanitary disposal devices comprising, a privy-type box open at its top and embodying a bottom wall and coacting side walls and end walls defining an animal enclosure, one end wall having an opening providing an entrance to and an exit from said enclosure, the other end wall having an excrement discharging opening cooperating with said bottom wall, the bottom portion of said box being adapted to contain and confine a bed of loose kitty litter, sand or the like, an excrement trapping, collecting and emptying tray adapted to be aligned with said excrement discharging opening at will, and an openwork grate within the confines of said box, said grate being normally positioned atop said bottom wall and being manually and timely tiltable toward said excrement discharging opening in a manner to slidingly dump the accumulated excrement into the receptacle portion of said tray.

2. The device defined in and according to claim 1, and wherein said bottom wall is provided with spaced parallel forward and rearward box seating and supporting rests adapted to reside firmly atop the floor of a room in a manner to elevate said bottom wall a prescribed distance above the level of said floor.

3. The device defined in and according to claim 2, and wherein said tray is separate from said box and is open along one side as well as at its top and is of a length commensurate with the width of the box and is accordingly such that it can be temporarily lined up with said excrement discharging opening.

4. The device set forth in claim 3, and, in combination, a grate residing flatwise atop said floor and ranging from said one end wall to said other end wall, the end of said grate which is proximal to the last named end wall being hingedly joined to said bottom floor, the end which is proximal to said first named end wall being free and having a fingergrip which can be caught hold of in a manner to lift the grate out of said bed of litter in a manner to assume an angle inclined toward said tray, whereby to cause the trapped excrement to be dumped through said excrement discharging opening into the receptacle portion of said tray.

5. A portable indoor animal excrement collecting, handling and sanitary disposal device comprising, a privy-type box, said box being open at its top and embodying a bottom wall providing a floor, coacting side walls and end walls defining an animal enclosure, one end wall having an opening providing an entrance to and an exit from said enclosure, the other end wall having an excrement discharging opening cooperating with said bottom wall, the bottom portion of said box being adapted to contain and confine a bed of loose kitty litter, sand or the like, a grate residing flatwise atop said floor and ranging from said one end wall to said other end wall, the end of said grate which is proximal to the last named end wall being hingedly joined to said bottom wall, the end which is proximal to said first named end wall being free and having a fingergrip which can be caught hold of in a manner to lift the grate out of said bed of litter in a manner to assume an angle inclined toward said bottom wall, whereby to cause the trapped excrement to be dumped through said excrement discharging opening.

6. The device defined in and according to claim 5 and, in combination, a lid slidingly mounted and normally covering said open top, said bottom wall being provided at the end adjacent said excrement discharging opening with a depending vertical flange, said bottom wall being provided on an underneath side with fixed floor engaging box elevating and supporting rests, said rests spacing the bottom marginal edge of said flange slightly above the room floor's surface, and an attachable and detachable accumulating and emptying tray having an open top and one open side and also having bottom and end walls cooperable with said flange and adjacent end portions of said box in a manner to orient and line up the tray with said opening when the grate is angled to assume its excrement discharging position.

7. The device defined in and according to claim 6, and wherein said flange is flat-faced and of a length corresponding to the width of said rear end wall, and also wherein the tray is commensurate in length with the length of said flange.

8. The device defined in and according to claim 5 wherein said bottom wall is provided at the end adjacent said excrement discharging opening with a depending vertical flange, said bottom wall being further provided on an underneath side with forward and rearward floor engaging box elevating and supporting rests, said rest being spaced apart in confronting parallel relation and having coplanar bottom surfaces spacing the bottom marginal edge of said flange slightly above a stationary support surface, and an attachable and detachable excrement accumulating and emptying tray having an open top and one open side and also having bottom and end walls cooperable with said flange and adjacent end portions of said box in a manner to orient and line up the open top of said one open side of said tray with said opening when the grate is angled to assumed an excrement discharging position.

References Cited

UNITED STATES PATENTS

| | | | |
|---|---|---|---|
| 1,825,557 | 9/1931 | Stoner | 119—16 |
| 2,712,677 | 7/1955 | Hyde | 119—16 X |
| 3,233,588 | 2/1966 | Thomas | 119—1 |
| 3,246,630 | 4/1966 | Dearing et al. | 119—1 |

HUGH R. CHAMBLEE, Primary Examiner